US012686630B2

(12) United States Patent
Someya et al.

(10) Patent No.: US 12,686,630 B2
(45) Date of Patent: Jul. 21, 2026

(54) UV-TRANSMITTING GLASS AND MOLDED PRODUCTS

(71) Applicant: AGC Inc., Tokyo (JP)

(72) Inventors: Takenori Someya, Tokyo (JP); Naoki Kanno, Tokyo (JP)

(73) Assignee: AGC Inc., Tokyo (JP)

(*) Notice: Subject to any disclaimer, the term of this patent is extended or adjusted under 35 U.S.C. 154(b) by 160 days.

(21) Appl. No.: 18/393,971

(22) Filed: Dec. 22, 2023

(65) Prior Publication Data

US 2024/0124344 A1 Apr. 18, 2024

Related U.S. Application Data

(60) Division of application No. 16/878,674, filed on May 20, 2020, now abandoned, which is a continuation of (Continued)

(30) Foreign Application Priority Data

Jan. 22, 2018 (JP) ................................. 2018-008389

(51) Int. Cl.
  *C03C 4/00* (2006.01)
  *C03C 3/064* (2006.01)
  (Continued)

(52) U.S. Cl.
  CPC .............. *C03C 3/068* (2013.01); *C03C 3/064* (2013.01); *C03C 3/122* (2013.01); *C03C 4/0085* (2013.01)

(58) Field of Classification Search
  CPC .................. C03C 3/068; C03C 4/0085; C03C 3/064–066
  See application file for complete search history.

(56) References Cited

U.S. PATENT DOCUMENTS 4,111,707 A * 9/1978 Komorita ................ C03C 3/064
                                                    501/51
4,226,627 A * 10/1980 Inoue ...................... C03C 3/068
                                                    501/901
(Continued)

FOREIGN PATENT DOCUMENTS

CN      101282915 A    10/2008
CN      106477880 A    3/2017
(Continued)

OTHER PUBLICATIONS

WO-2016027660-A1 (Matano) Feb. 25, 2016 (English language translation). [online] [retrieved Jul. 30, 2025]. Retrieved from: Espacenet. (Year: 2016).*

(Continued)

*Primary Examiner* — Erin Snelting
(74) *Attorney, Agent, or Firm* — Oblon, McClelland, Maier & Neustadt, L.L.P.

(57) ABSTRACT

A UV-transmitting glass formed of a multi-component oxide, and having at least one of characteristics of an internal transmittance $\tau_{350\text{-}400}$(%) with respect to light having a wavelength between 350 nm and 400 nm through a 10 mm-thick glass that satisfies $\tau_{350\text{-}400} \geq 90 \ldots$ (1); an internal transmittance $\tau_{300\text{-}350}$(%) with respect to light having a wavelength between 300 nm and 350 nm through a 10 mm-thick glass that satisfies $\tau_{300\text{-}350} \geq 75 \ldots$ (2); and an internal transmittance $\tau_{260\text{-}300}$(%) with respect to light having a wavelength between 260 nm and 300 nm through a 10 mm-thick glass that satisfies $\tau_{260\text{-}300} \geq 45 \ldots$ (3).

9 Claims, 1 Drawing Sheet

Related U.S. Application Data application No. PCT/JP2019/001644, filed on Jan. 21, 2019.

(51) Int. Cl.
   C03C 3/068          (2006.01)
   C03C 3/12           (2006.01)

(56)                    References Cited

U.S. PATENT DOCUMENTS

| 2009/0131240 | A1 | 5/2009 | Shimizu |
| 2018/0050953 | A1 | 2/2018 | Inaba et al. |
| 2018/0057393 | A1 | 3/2018 | Sakagami et al. |

FOREIGN PATENT DOCUMENTS

| CN | 107428595 | A | 12/2017 |
| CN | 10761 4448 | A | 1/2018 |
| JP | 62-087433 | A | 4/1987 |
| JP | 03-093644 | A | 4/1991 |
| JP | 03-093645 | A | 4/1991 |
| JP | 5-93645 | A | 4/1993 |
| JP | 2001-064038 | A | 3/2001 |
| JP | 2011-032162 | A | 2/2011 |
| JP | 2016-052971 | A | 4/2016 |
| WO | WO-2016027660 | A1 * | 2/2016 | ............. C03C 3/247 |

OTHER PUBLICATIONS

JP-2016-052971-A (Momono) Apr. 14, 2016 (English language translation). [online] [retrieved Mar. 23, 2023]. Retrieved from: Espacenet. (Year: 2016).*

Combined Chinese Office Action and Search Report issued Feb. 15, 2022, in corresponding Chinese Patent Application No. 201980008347.1 (with English Translation of Category of Cited Documents), 9 pages.

* cited by examiner

ADDED AMOUNT of $SnO_2$ [mass%]

ADDED AMOUNT of $SnO_2$ [mass%]

UV-TRANSMITTING GLASS AND MOLDED PRODUCTS

CROSS-REFERENCE TO RELATED APPLICATIONS

This application is a divisional of U.S. application Ser. No. 16/878,674 filed May 20, 2020, pending, which is a continuation application of and claims the benefit of priority under 35 U.S.C. § 365(c) from PCT International Application PCT/JP2019/001644 filed on Jan. 21, 2019, which is designated the U.S., and is based upon and claims the benefit of priority of Japanese Patent Application No. 2018-008389 filed on Jan. 22, 2018, the entire contents of which are incorporated herein by reference.

TECHNICAL FIELD

The present disclosure relates to glass having good ultraviolet (UV) transmittance and molded products using the glass.

BACKGROUND ART

As materials that transmit UV light, synthetic quartz and sapphire are favorably used because of their good UV transmittance; however, these are high-cost materials when manufacturing products because these are expensive by themselves, require time-consuming processing, and the processing costs are high in order to have desired three-dimensional shapes.

Also, as a glass whose UV transmittance is improved by adjusting the components contained in the glass, examples have been known in which a reducing agent such as an organic substance or metal is added to the glass (see, e.g., Japanese Laid-Open Patent Applications No. 03-93644 and No. 03-93645).

However, in the case where the melting time during manufacturing becomes longer, a glass as described in these patent documents may be reoxidized by oxygen in the melting atmosphere, which decreases the UV transmittance again.

Further, it has been known that a high-refractive-index glass having a refractive index of greater than or equal to 1.7 has a low UV transmittance in general; however, according to the present disclosure, it is possible to provide a glass product having a high refractive index while maintaining a good UV transmittance.

The inventors of the present disclosure have conducted intensive studies in order to solve the above-described problems, and as a result, have found that in a glass made of a multi-component oxide, by lowering the content of the iron component, and by controlling the oxidation state, the light transmittance in the UV region can be improved, and thus, have come to complete the present disclosure.

SUMMARY

According to an aspect in the present disclosure, a UV-transmitting glass according to the present disclosure is formed of a multi-component oxide, and has an internal transmittance $\tau_{350\text{-}400}$(%) with respect to light having a wavelength between 350 nm and 400 nm through a 10 mm-thick glass that satisfies the following formula (1):

$$\tau_{350\text{-}400} \geq 90 \tag{1}$$

Also, another UV-transmitting glass according to the present disclosure is formed of a multi-component oxide, and has an internal transmittance $\tau_{300\text{-}350}$(%) with respect to light having a wavelength between 300 nm and 350 nm through a 10 mm-thick glass that satisfies the following formula (2):

$$\tau_{300\text{-}350} \geq 75 \tag{2}$$

Also, yet another UV-transmitting glass according to the present disclosure is formed of a multi-component oxide, and has an internal transmittance $\tau_{260\text{-}300}$(%) with respect to light having a wavelength between 260 nm and 300 nm through a 10 mm-thick glass that satisfies the following formula (3):

$$\tau_{260\text{-}300} \geq 45 \tag{3}$$

A molded product according to the present disclosure is made of a UV-transmitting glass according to the present disclosure and has a desired shape.

EMBODIMENTS OF THE INVENTION

Figure 1:
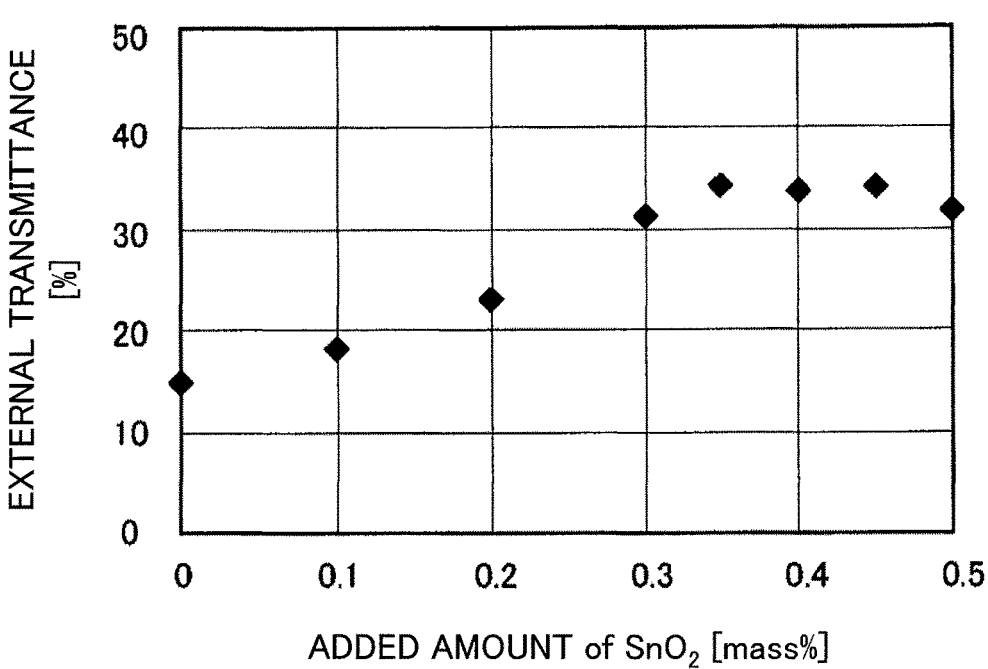
FIG. 1 is a graph illustrating a relationship between the added amount of $SnO_2$ and the external transmittance in Example 2-1.

In the following, UV-transmitting glass according to the present disclosure, and manufacturing methods and molded products of the glass will be described in detail with reference to an embodiment.

A UV-transmitting glass according to the present disclosure has a good transmittance with respect to light in the UV region, and is useful as the material of a product that transmits UV light.

Further, in the case of having a high refractive index, processability and moldability are sufficient while having optical performance close to that of sapphire, and the production cost of a product can be reduced.

A method of manufacturing a UV-transmitting glass according to the present disclosure enables to stably and efficiently manufacture the UV-transmitting glass by simple operations.

A molded product according to the present disclosure has a good transmittance with respect to light in the UV region and is useful as a product that transmits UV light.

[UV-Transmitting Glass]

A UV-transmitting glass of the present embodiment is a glass material made of an oxide, and has a good transmittance of light having a wavelength in the UV region.

As a UV-transmitting glass of the present embodiment, for example, a glass that is formed of a multi-component oxide, and has an internal transmittance $\tau_{350\text{-}400}$(%) with respect to light having a wavelength between 350 nm and 400 nm through a 10 mm-thick glass that satisfies the following formula (1), may be cited.

$$\tau_{350\text{-}400} \geq 90 \tag{1}$$

Also, as a UV-transmitting glass of the present embodiment, for example, a glass that is formed of a multi-component oxide, and has an internal transmittance $\tau_{300\text{-}350}$ (%) with respect to light having a wavelength between 300 nm and 350 nm through a 10 mm-thick glass that satisfies the following formula (2), may be cited.

$$\tau_{300\text{-}350} \geq 75 \tag{2}$$

Also, as a UV-transmitting glass of the present embodiment, for example, a glass that is formed of a multi-component oxide, and has an internal transmittance $\tau_{260\text{-}300}$ (%) with respect to light having a wavelength between 260 nm and 300 nm through a 10 mm-thick glass that satisfies the following formula (3), may be cited.

$$\tau_{260\text{-}300} \geq 45 \tag{3}$$

In other words, as a UV-transmitting glass of the present embodiment, it is sufficient to satisfy at least one of the characteristics expressed by the above-described formulas (1) to (3), to favorably satisfy two, and to more favorably satisfy all the three. For each of these formulas (1) to (3), it is necessary to satisfy the above-described inequality in the entire wavelength range described above, which may be rephrased that a minimum value of the internal transmittance in each of the above-described wavelength ranges satisfies the corresponding inequality described above.

Also, in the above-described formulas (1) to (3), it is favorable for the internal transmittances to satisfy the following values. The internal transmittance $\tau_{350\text{-}400}$ is favorably greater than or equal to 93%, more favorably greater than or equal to 95%. The internal transmittance $\tau_{300\text{-}350}$ is favorably greater than or equal to 79%, more favorably greater than or equal to 83%, and particularly favorably greater than or equal to 86%. The internal transmittance $\tau_{260\text{-}300}$ is favorably greater than or equal to 50%, more favorably greater than or equal to 55%, particularly favorably greater than or equal to 65%, and most favorably greater than or equal to 70%.

In the present Description, the internal transmittance is a transmittance with respect to a sample manufactured using a UV-transmitting glass to be measured, excluding the surface reflection loss on the incident side and the emission side, which is well known in this technical field, and the measurement may be performed by a commonly practiced method. The measurement is performed, for example, as follows.

A pair of flat samples (a first sample and a second sample) made of glass having the same composition and different thicknesses are prepared. Both sides of each flat sample are made flat, parallel to each other, and optically polished. Denoting the intensity of incident light perpendicularly incident on the optically polished surface of the first sample by Iin(1), and the intensity of outgoing light emitted from the opposite surface by Iout(1), the external transmittance T1 including the surface reflection loss of the first sample is represented by an intensity ratio Iout(1)/Iin(1). Similarly, denoting the intensity of incident light perpendicularly incident on the optically polished surface of the second sample by Iin(2), and the intensity of outgoing light emitted from the opposite surface by Iout(2), the external transmittance T2 including the surface reflection loss of the second sample is represented by an intensity ratio Iout(2)/Iin(2).

Denoting a thickness of the first sample by d1 (mm) and a thickness of the second sample by d2 (mm) where d1<d2, the internal transmittance $\tau$ through a thickness dx (mm) can be calculated by the following formula (a):

$$\tau = \exp[-dx \times (\ln T1 - \ln T2)/\Delta d] \tag{a}$$

where $\Delta d = d2 - d1$, and ln means natural logarithm. For a UV-transmitting glass of the present embodiment, an internal transmittance converted to a thickness of 10 mm is defined as an index; therefore, the internal transmittance in the above-described wavelength range is calculated for each wavelength using the following formula (b).

$$\tau \ (10 \ \text{mm}) = \exp[-10 \times (\ln T1 - \ln T2)/\Delta d] \tag{b}$$

The composition of such a UV-transmitting glass is not limited in particular as long as it is a glass made of a multi-component oxide and satisfies the internal transmittances specified as above. However, the glass is made of a multi-component oxide containing multiple species of oxide compounds, and hence, quartz glass is not included.

As the composition system of such a UV-transmitting glass, specifically, those of glasses having a mother composition of borosilicate glass, silicate glass, phosphate glass, fluorophosphate glass, and the like may be listed.

It is favorable that such a glass has a lowered content of the iron component in particular. Here, the iron component is present in the glass as having the valence of $Fe^{3+}$ or $Fe^{2+}$, and the total iron oxide content obtained by converting the iron component contained in the glass into $Fe_2O_3$ is represented as $T\text{-}Fe_2O_3$ (mass ppm).

In a UV-transmitting glass of the present embodiment, $T\text{-}Fe_2O_3$ is favorably less than or equal to 1.5 mass ppm, more favorably less than or equal to 1 mass ppm, further favorably less than 0.9 mass ppm, and a smaller content is more favorable. The above-described iron component is introduced into the glass mainly as impurities contained in the glass raw materials, except for contamination by iron in a dissolution process.

Also, regarding the iron component, it is favorable to reduce the iron component contained in the glass from $Fe^{3+}$ to $Fe^{2+}$ to adjust the valence. The UV transmittance can be improved by reducing the amount of $Fe^{3+}$, which absorbs UV light significantly. The method of adjusting the valence of iron as such will be described in detail later, which is possible by adding a component serving as a reducing agent into glass raw materials or glass cullets when melting a glass, by using a non-oxidizing atmosphere when melting the glass, or the like. In this case, a molded product to be obtained from the glass will have a high $Fe^{2+}$ redox. The $Fe^{2+}$ redox is a ratio of the amount of $Fe^{2+}$ to the total iron content, and is obtained as a ratio between the amounts each converted to $Fe_2O_3$.

Also, the amount of $Fe^{3+}$ can also be evaluated by electron spin resonance (ESR); when the amount of $Fe^{3+}$ is small, the $Fe^{3+}$ intensity measured by ESR is low. By selecting the type, amount, and dissolution atmosphere of a reducing agent so that the $Fe^{3+}$ intensity measured by ESR becomes favorably less than or equal to 0.0215, more favorably less than or equal to 0.0180, even more favorably less than or equal to 0.0150, and particularly favorably less than or equal to 0.0115, it is possible to obtain a glass that exhibits a high transmittance even in a shorter wavelength region. When the amount of $T\text{-}Fe_2O_3$ is large, it is favorable to lower the $Fe^{3+}$ intensity by increasing the reducibility of the glass. When the amount of $T\text{-}Fe_2O_3$ is small, the amount of $Fe^{3+}$ is small, and thereby, the $Fe^{3+}$ intensity is low.

Although it is possible to contain various transition metal oxides as the glass components in general glass, in a UV-transmitting glass according to the present disclosure, in order to improve the UV transmittance, it is favorable to lower the content of a component that absorbs light in the UV region.

In order to improve the transmittance in the near UV region, in a UV-transmitting glass, for example, the content of $Bi_2O_3$, $TiO_2$, $WO_3$, and $Gd_2O_3$ is favorably less than or equal to 3 mol %, more favorably less than or equal to 1 mol %, and particularly favorably virtually zero, in terms of mol % on an oxide basis. Also, in order to improve the transmittance in the deep UV region, further, in addition to the above-described restrictions, in a UV-transmitting glass, the content of $Nb_2O_5$ and $Ta_2O_5$ is favorably less than or equal to 3 mol %, more favorably less than or equal to 1 mol %, and particularly favorably virtually zero, in terms of mol % on an oxide basis.

Note that in the present Description, "content being virtually zero" means intentionally excluding the substance, except when unavoidably introduced due to impurities in the glass raw materials, and specifically means a content of less than or equal to 0.01 mol %.

With respect to such a UV-transmitting glass, as more specific glass compositions, for example, the following glass composition 1 and glass composition 2 may be listed as favorable ones. Here, the glass composition 1 is an example of a composition having a high refractive index n d being greater than or equal to 1.7, and the glass composition 2 is an example of a composition having a low refractive index n d being less than 1.7.

(Glass Composition 1)

The present glass composition 1 is a composition containing $B_2O_3$ by 10 to 80%, $SiO_2$ by 0 to 25%, $La_2O_3$ by 2 to 32%, and $Y_2O_3$ by 0 to 20%, in terms of mol % on an oxide basis.

In the present glass composition 1, $B_2O_3$ is an essential component, which can form a glass skeleton, increase the stability of the glass, and increase the UV transmittance. By having a $B_2O_3$ content greater than or equal to 10 mol % (hereafter, mol % is simply abbreviated to %) in the glass, it is possible to obtain a stable glass. The $B_2O_3$ content is favorably greater than or equal to 20%, more favorably greater than or equal to 30%, and particularly favorably greater than or equal to 40%. On the other hand, by having a $B_2O_3$ content less than or equal to 80%, it is possible to prevent occurrence of phase separation of the glass. The $B_2O_3$ content is favorably less than or equal to 75% and more favorably less than or equal to 70%.

In the present glass composition 1, $SiO_2$ is an optional component that can form a glass skeleton as with $B_2O_3$, increase the stability of the glass, increase the devitrification resistance, and prevent phase separation of the glass. By having an $SiO_2$ content less than or equal to 25%, it is possible to avoid undissolved residue during dissolution. The $SiO_2$ content is favorably less than or equal to 20% and more favorably less than or equal to 18%. Note that in order to lower the liquid phase temperature to make the glass less likely to be devitrified, and to improve the chemical durability, it is favorable to contain $SiO_2$, and the content thereof is more favorably greater than or equal to 1%, particularly favorably greater than or equal to 3%, and most favorably greater than or equal to 5%.

In the present glass composition 1, $La_2O_3$ is an essential component, which can maintain a high UV transmittance while increasing the refractive index. By having a $La_2O_3$ content greater than or equal to 2%, it is possible to obtain a desired high refractive index. The $La_2O_3$ content is favorably greater than or equal to 5%, more favorably greater than or equal to 6%. On the other hand, by having a $La_2O_3$ content less than or equal to 32%, it is possible to control increase in the liquid phase temperature and to make the glass less likely to be devitrified. The $La_2O_3$ content is favorably less than or equal to 28%, more favorably less than or equal to 25%, and particularly favorably less than or equal to 22%.

In the present glass composition 1, $Y_2O_3$ is a component that can maintain a high UV index while increasing the refractive index, and by coexisting with $La_2O_3$, lower the liquid phase temperature so as to improve the devitrification resistance. By having a $Y_2O_3$ content less than or equal to 20%, it is possible to control increase in the melting temperature and the molding temperature, and also to control increase in the liquid phase temperature so as to make the glass less likely to be devitrified. The $Y_2O_3$ content is favorably less than or equal to 15%, more favorably less than or equal to 13%, and particularly favorably less than or equal to 10%. In order to increase the refractive index, $Y_2O_3$ is favorably contained, more favorably by greater than or equal to 2%, particularly favorably by greater than or equal to 4%, and most favorably by greater than or equal to 5%.

The present glass composition 1 may further contain the following components.

In the present glass composition 1, $Li_2O$ is a component that can improve the meltability of the glass, and lower the glass transition temperature and the softening temperature, which is an optional component. By having a $Li_2O$ content less than or equal to 15%, it is possible to control decrease in the refractive index, and to control increase in the liquid phase temperature. The $Li_2O$ content is favorably less than or equal to 13%, more favorably less than or equal to 10%, and particularly favorably less than or equal to 5%. In the case of applying hot forming to the glass at a later process, it is necessary to lower the glass transition temperature; in this case, it is favorable to contain $Li_2O$, more favorably by greater than or equal to 1%, and particularly favorably by greater than or equal to 2%.

In the present glass composition 1, $Na_2O$ is a component that can improve the meltability of the glass, and lower the glass transition temperature and the softening temperature, which is an optional component. By having a $Na_2O$ content less than or equal to 15%, it is possible to control decrease in the refractive index, and to control increase in the liquid phase temperature. The $Na_2O$ content is favorably less than or equal to 13%, more favorably less than or equal to 10%, and particularly favorably less than or equal to 5%.

In the present glass composition 1, $K_2O$ is a component that can improve the meltability of the glass, and lower the glass transition temperature and the softening temperature, which is an optional component. By having a $K_2O$ content less than or equal to 15%, it is possible to control decrease in the refractive index, and to control increase in the liquid phase temperature. The $K_2O$ content is favorably less than or equal to 13%, more favorably less than or equal to 10%, and particularly favorably less than or equal to 5%.

In the present glass composition 1, ZnO is a component that can improve the meltability of the glass, and lower the glass transition temperature and the softening temperature, which is an optional component that can be contained by a large amount while maintaining the devitrification resistance. By having a ZnO content less than or equal to 35%, it is possible to control decrease in the refractive index. The ZnO content is favorably less than or equal to 33%, more favorably less than or equal to 25%, and particularly favorably less than or equal to 20%.

In the present glass composition 1, MgO is a component that can prevent phase separation of the glass, and improve the meltability, which is an optional component. By having a MgO content less than or equal to 15%, it is possible to control decrease in the refractive index and increase in the liquid phase temperature. The MgO content is favorably less than or equal to 13%, more favorably less than or equal to 10%, and particularly favorably less than or equal to 5%.

In the present glass composition 1, CaO is a component that can prevent phase separation of the glass, and improve the meltability, which is an optional component. By having a CaO content less than or equal to 15%, it is possible to control decrease in the refractive index and increase in the liquid phase temperature. The CaO content is favorably less than or equal to 13%, more favorably less than or equal to 10%, and particularly favorably less than or equal to 5%.

In the present glass composition 1, SrO is a component that can prevent phase separation of the glass, and improve the meltability, which is an optional component. By having an SrO content less than or equal to 15%, it is possible to control decrease in the refractive index and increase in the liquid phase temperature. The SrO content is favorably less than or equal to 13%, more favorably less than or equal to 10%, and particularly favorably less than or equal to 5%.

In the present glass composition 1, BaO is a component that can prevent phase separation of the glass, and improve the meltability, which is an optional component. By having a BaO content less than or equal to 15%, it is possible to control decrease in the refractive index and increase in the liquid phase temperature. The BaO content is favorably less than or equal to 13%, more favorably less than or equal to 10%, and particularly favorably less than or equal to 5%.

In the present glass composition 1, $ZrO_2$ is a component that can increase the refractive index while maintaining a high UV transmittance, and improve the devitrification resistance, which is an optional component. By having a $ZrO_2$ content less than or equal to 15%, it is possible to prevent decrease in the devitrification resistance due to an excessive content. The $ZrO_2$ content is favorably less than or equal to 13% and more favorably less than or equal to 10%.

In the present glass composition 1, $Al_2O_3$ is a component that can increase the chemical durability, and control phase separation of the glass, which is an optional component. By having an $Al_2O_3$ content less than or equal to 10%, it is possible to control decrease in the refractive index, and to control increase in the liquid phase temperature. The $Al_2O_3$ content is favorably less than or equal to 5%, more favorably less than or equal to 3%, and particularly favorably less than or equal to 1%.

In the present glass composition 1, $Sb_2O_3$ oxidizes the glass; therefore, it is favorable to lower the content in order to increase the deep UV transmittance, which may be less than or equal to 0.1%, favorably less than or equal to 0.05%, more favorably virtually zero.

In the present glass composition 1, in order to reduce the environmental load, it is favorable to contain virtually no PbO and $As_2O_3$ except for inevitable contamination. F has volatility; therefore, it is favorable not to contain F in the case of desiring to control fluctuations in striae and optical characteristics.

As an optical characteristic of the present glass composition 1, the refractive index n d is greater than or equal to 1.7. Although the suitable refractive index varies depending on applications of molded products, a higher refractive index can make the focal length of a lens shorter, and hence, is suitable for reducing the size and thickness of an optical element. The refractive index n d is favorably greater than or equal to 1.71, more favorably greater than or equal to 1.72, and particularly favorably greater than or equal to 1.73.

(Glass Composition 2)

The present glass composition 2 is a composition that contains $B_2O_3+SiO_2+P_2O_5$ by 40 to 90%, $Li_2O+Na_2O+K_2O$ by 0 to 30%, $MgO+CaO+SrO+BaO$ by 0 to 20%, in terms of mol % on an oxide basis.

In the present glass composition 2, $B_2O_3$, $SiO_2$, and $P_2O_5$ are components that form a glass skeleton. If the content of $B_2O_3+SiO_2+P_2O_5$ is too large, the solubility decreases; therefore, the content may be less than or equal to 90%, favorably less than or equal to 85%, and more favorably less than or equal to 80%. In order to improve the devitrification resistance, the content may be greater than or equal to 40%, and favorably greater than or equal to 45%. In order to increase the chemical durability, it is favorable to contain $SiO_2$, and more favorably by greater than or equal to 5%. In order to increase the solubility, the $SiO_2$ content is favorably less than or equal to 70%, more favorably less than or equal to 60%, and particularly favorably less than or equal to 50%. In order to lower the melting temperature, it is favorable to contain $B_2O_3$, more favorably by greater than or equal to 5%, and particularly favorably by 10%. In order to prevent phase separation, the $B_2O_3$ content is favorably less than or equal to 80%, and more favorably less than or equal to 75%.

In the present glass composition 2, $Li_2O$, $Na_2O$, and $K_2O$ may be contained to lower the melting temperature. If the content is too large, the glass tends to be devitrified; therefore, the content of $Li_2O+Na_2O+K_2O$ may be less than or equal to 30%, favorably less than or equal to 25%, and more favorably less than or equal to 20%.

In the present glass composition 2, MgO, CaO, SrO, and BaO may be contained to lower the melting temperature. If the content is too large, the glass tends to be devitrified; therefore, the content of $MgO+CaO+SrO+BaO$ may be less than or equal to 20%, favorably less than or equal to 15%, and more favorably less than or equal to 10%.

The present glass composition 2 may further contain the following components. In the present glass composition 2, ZnO is a component that can improve the meltability of the glass, and lower the glass transition temperature and the softening temperature. The ZnO content may be less than or equal to 10%, and favorably less than or equal to 5%.

In the present glass composition 2, $Al_2O_3$ is a component that can increase the chemical durability, and control phase separation of the glass. By having an $Al_2O_3$ content less than or equal to 20%, it is possible to control increase in the liquid phase temperature. The $Al_2O_3$ content may be favorably less than or equal to 15%, and more favorably less than or equal to 10%.

In the present glass composition 2, $Sb_2O_3$ oxidizes the glass; therefore, it is favorable to lower the content in order to increase the deep UV transmittance, which may be less than or equal to 0.1%, favorably less than or equal to 0.05%, more favorably virtually zero.

In the present glass composition 2, in order to reduce the environmental load, it is favorable to contain virtually no PbO and $As_2O_3$ except for inevitable contamination. F has volatility; therefore, it is favorable not to contain F in the case of desiring to control fluctuations in striae and optical characteristics.

Further, a UV-transmitting glass of the present embodiment favorably has the following characteristics.

In applications that require applying hot forming, such as reheat press molding, to the present UV-transmitting glass, by lowering the glass transition temperature, it is possible to lower the molding temperature during the pressing, and thereby, to improve the durability of a protective film and the like formed on the mold surface. In this case, the glass transition temperature Tg is favorably lower than or equal to 650° C., more favorably lower than or equal to 620° C., and particularly favorably lower than or equal to 600° C.

The present UV-transmitting glass is used in an optical system; therefore, a higher UV transmittance is more favorable. Using a coloration code of $\lambda_{70}$ and $\lambda_5$ as an indicator for the external transmittance, $\lambda_{70}$, which represents a wavelength at which a glass having a thickness of 10 mm exhibits 70% of the external transmittance, is favorably less than or equal to 305 nm, more favorably less than or equal to 300 nm, particularly favorably less than or equal to 295 nm, and most favorably less than or equal to 285 nm. Also, $\lambda_5$, which represents a wavelength at which a glass having a thickness of 10 mm exhibits 5% of the external transmittance, is favorably less than or equal to 240 nm, more favorably less than or equal to 235 nm, particularly favorably less than or equal to 230 nm, and most favorably less than or equal to 220 nm.

By lowering the liquid phase temperature, it is possible to make the present UV-transmitting glass less likely to be devitrified when molding a molded product from a glass melt, and to improve the productivity and the glass quality. The liquid phase temperature is favorably lower than or equal to 1200° C., more favorably lower than or equal to 1150° C., and further favorably lower than or equal to 1100° C. Note that in the present Description, the liquid phase temperature is a minimum temperature at which a crystal solid is not formed from a glass melt when held at a certain temperature for a certain period of time.

[Manufacturing Method of UV-Transmitting Glass]

A method of manufacturing a UV-transmitting glass of the present embodiment is a method of manufacturing a UV-transmitting glass of the above-described embodiment. This method of manufacturing a UV-transmitting glass is based on a conventionally known method of manufacturing glass, in which glass raw materials or glass cullets are melted, and the obtained glass melt is cooled and solidified. At this time, in the present embodiment, it is favorable to lower the iron content in the glass and to control the oxidation-reduction state of the components contained in the obtained glass so as to obtain good UV transmission characteristics.

The glass materials or glass cullets to be prepared are not limited in particular as long as a UV-transmitting glass of the present embodiment can be obtained. As the raw materials, for example, nitrate, sulfate, carbonate, hydroxide, oxide, boric acid, and the like are used. Glass raw materials from which the above-described glass composition 1 or glass composition 2 is obtained are favorable.

The glass materials or glass cullets are heated to a temperature higher than or equal to the melting temperature to obtain a glass melt; as a melting condition in this process, it is possible to consider two cases for the atmosphere which the glass melt contacts: one is the air atmosphere (an oxidizing atmosphere); and the other is a non-oxidizing atmosphere. To prepare a non-oxidizing atmosphere, a method of introducing a non-oxidizing gas such as nitrogen or argon into the furnace, or a method of introducing flame of a burner using a combustible gas that does not contain oxygen, such as city gas, into the furnace, or the like may be used.

When containing a reducing agent in the glass raw materials or glass cullets, a reducing agent that will remain in the glass to be obtained is considered as a glass raw material, and a reducing agent that will not remain in the glass is considered as an external additive to the glass raw materials. As the reducing agent used here, as those remaining in the glass, $SnO_2$, SnO, silicon (Si), aluminum (Al), and fluorides (aluminum fluoride, lanthanum fluoride, etc.); or as those volatilized and not remaining in the glass, carbon (C) and the like may be listed. Carbon (C) can be added as a carbohydrate such as carbon powder or sucrose.

Here, as the reducing agent, in the case of using a material containing at least one species of tin oxide selected from among $SnO_2$ and SnO, and in the case where melting is performed in the air atmosphere, it is favorable to add the tin oxide by an amount of more than 0.3 mass % and less than or equal to 3 mass % as the total amount of $SnO_2$ and SnO. If the content is less than or equal to 0.3 mass %, the effect of improving the UV transmittance is insufficient; therefore, it is favorable to add an amount of greater than or equal to 0.35 mass %. If the content exceeds 3 mass %, the transmittance is lowered on the contrary; therefore, it is added by an amount of favorably less than or equal to 2 mass %, more favorably less than or equal to 1 mass %.

On the other hand, in the case where melting is performed in a non-oxidizing atmosphere, it is favorable to add the tin oxide by an amount of more than 0 mass % and less than or equal to 0.3 mass % as the total amount of $SnO_2$ and SnO. By adding more than 0 mass %, it is possible to further improve the UV transmittance, and it is favorable to add an amount of greater than or equal to 0.01 mass %. If adding the tin oxide by greater than or equal to 0.3 mass %, the transmittance is lowered. The amount is favorably less than or equal to 0.2 mass %, and more favorably less than or equal to 0.1 mass %. Although tin oxide is present in a glass as having the valences of $Sn^{2+}$ and $Sn^{4+}$, as described above, by determining the amount of tin oxide to be added according to the melting atmosphere, the glass can be stably maintained in a reduced state; therefore, a greater amount of $Sn^{2+}$ is detected in the glass-molded product compared with conventional melting methods.

In the case of using carbon (C) as the reducing agent, the amount to be added may be determined according to the glass melting atmosphere and the melting time; for example, in a non-oxidizing atmosphere, it is favorable to externally add the agent by greater than or equal to 0.2 mass % and less than or equal to 1 mass % with respect to 100 mass % of the glass. Note that in this case, as carbon becomes carbon dioxide to be volatilized during the glass manufacturing operations, no carbon component derived from the reducing agent will remain in the UV-transmitting glass to be obtained.

The molten glass obtained in this way is cooled and solidified by a publicly-known method to obtain a UV-transmitting glass. In the case of obtaining the UV-transmitting glass as a glass block, a product having a desired shape can be obtained by performing processing including grinding, polishing, and the like. Also, in the case where the molten glass is poured into a molding die or the like to be cooled and solidified, a desired shape is given as it is; therefore, a molded product can be obtained by taking it out of the molding die. At a later process, the obtained glass-molded product may be softened by heating to be pressed against a molding die so as to be shaped.

[Molded Products]

A molded product of the present embodiment is a molded object made of a UV-transmitting glass of the present embodiment described above and formed into a desired shape. Here, a molded product of the present embodiment can be formed into any shape according to its application, and the molded product may be manufactured by a publicly-known method, for example, a method as described with the method of manufacturing a UV-transmitting glass. Also, in some cases, hot processing such as reheat pressing or redraw processing is performed in a later process.

Such a molded product can be used without particular limitation as a member that transmits UV light. As the applications, for example, water sterilization devices; curing devices for UV-curable resin; cover glass for UV sensors or the like; sealing materials of UV LEDs (UV light emitting diode); lighting equipment using UV light; optical elements such as lenses and optical filters that require a function of transmitting UV light; materials for photoresist exposure; replacements of optical parts made of quartz or the like such as beam shapers and cut aspheric lenses; core materials used in UV-transmitting optical fibers (the refractive index difference between the core and the clad can be large, and hence, the aperture angle can be widened and the output can be improved); cover glass with lens for laser diodes (LD) and light emitting diodes (LED); lens arrays; and the like may be listed.

The shape of a molded product of the present embodiment may set to be a desired shape according to an application as described above.

EXAMPLES

In the following, the present disclosure will be described with examples according to the embodiment, but the present disclosure is not limited to these. Examples 1-1 to 1-6 are examples according to the embodiment, and Example 1-7 is a comparative example. Also, the glass composition is represented by mass % (or mol %) on an oxide basis.

Example 1-1

Raw materials including nitrate, sulfate, hydroxide, oxide, and boric acid were weighed respectively, mixed thoroughly, and then, placed in a platinum crucible so as to obtain a glass having a composition shown in Table 1, heated and melted in the air at 1300° C. for 3 hours. The glass raw materials to be used were selected to have a low content of impurities such as iron and titanium.

The molten glass was poured into a preheated mold to be cooled and formed to be a plate, held at a temperature near the glass transition temperature for 4 hours, and then, gradually cooled down to room temperature at a cooling rate of −60° C./h, and a glass 1 was obtained that has an iron content of less than or equal to 1.5 mass ppm and an $Fe^{3+}$ intensity of less than or equal to 0.0215.

Example 1-2

$SnO_2$ was added as the reducing agent, and the glass raw materials were weighed so as to have a composition shown in Table 1. By substantially the same dissolution method and molding method as in Example 1-1, a glass 2 was obtained that has an iron content of less than or equal to 1.5 mass ppm and an $Fe^{3+}$ intensity of less than or equal to 0.0215.

Example 1-3

$SnO_2$ was added as the reducing agent, and the glass raw materials were weighed so as to have a composition shown in Table 1. The raw materials were placed in a platinum crucible, and heated at 1300° C. for 3 hours in a melting furnace filled with nitrogen gas, to be melted. Then, a glass-molded product was molded by substantially the same molding method as in Example 1-1, and a glass 3 was obtained that has an iron content of less than or equal to 1.5 mass ppm and an $Fe^{3+}$ intensity of less than or equal to 0.0215.

Example 1-4

SnO was added as the reducing agent, and the glass raw materials were weighed so as to have a composition shown in Table 1. The raw materials were placed in a platinum crucible, and heated at 1300° C. for 3 hours in a melting furnace filled with nitrogen gas, to be melted. Then, a glass-molded product was molded by substantially the same molding method as in Example 1-1, and a glass 4 was obtained that has an iron content of less than or equal to 1.5 mass ppm and an $Fe^{3+}$ intensity of less than or equal to 0.0215.

Example 1-5

The glass raw materials were weighed so as to have a composition shown in Table 1. The raw materials were placed in a platinum crucible, added with 0.4 mass % by outer percent of carbon powder as a reducing agent, and heated at 1300° C. for 3 hours in a melting furnace filled with nitrogen gas, to be melted. Then, a glass-molded product was molded by substantially the same molding method as in Example 1-1, and a glass 5 was obtained that has an iron content of less than or equal to 1.5 mass ppm and an $Fe^{3+}$ intensity of less than or equal to 0.0215. Note that the added carbon was volatilized as $CO_2$ when the glass was melted, and hence, did not remain in the glass-molded product.

Example 1-6

$SnO_2$ was added as the reducing agent, and the glass raw materials were weighed so as to have a composition shown in Table 1. The raw materials were placed in a platinum crucible, and heated at 1300° C. for 3 hours in a melting furnace filled with nitrogen gas, to be melted. Then, a glass-molded product was molded by substantially the same molding method as in Example 1-1, and a glass 6 was obtained that has an iron content of less than or equal to 1.5 mass ppm and an $Fe^{3+}$ intensity of less than or equal to 0.0215.

Example 1-7

The glass raw materials were weighed so as to have a composition shown in Table 1. As the used glass raw materials, materials having a large iron content were used. By substantially the same dissolution method and molding method as in Example 1-1, a glass 7 was obtained. By using the glass raw materials having a large iron content, the iron content of the glass exceeded 1.5 ppm, and the $Fe^{3+}$ intensity exceeded 0.0215 because no reducing agent was added.

[Characteristics]

The obtained glass was measured with respect to the refractive index, external transmittance, coloration code, internal transmittance, $T\text{-}Fe_2O_3$, and $Fe^{3+}$ intensity at a wavelength of 587.56 nm (d-line). Measuring methods of these will be described below.

(Refractive Index)

The refractive index was measured for a sample processed to have a rectangular parallelepiped shape having a side of greater than or equal to 5 mm and a thickness of greater than or equal to 5 mm, by using a precise refractive index meter (manufactured by Shimadzu Corporation, model: KPR-200, KPR-2000). The refractive index was measured for the sample obtained by being gradually cooled down at a cooling rate of −60° C./h.

(External Transmittance and Coloration Code)

The external transmittance was measured for 1 mm-thick and 10 mm-thick samples, each of which was polished on both sides, by using a spectrophotometer (manufactured by Hitachi High-Technologies Corporation, model: U-4100). The coloration code was read from the external transmittance at a thickness of 10 mm, which is shown in Table 1 as a wavelength $\lambda_{70}$ at which the external transmittance is 70% and a wavelength $\lambda_5$ at which the external transmittance is 5%. Also, an external transmittance at a thickness of 1 mm at a wavelength of 260 nm is shown as $T_{260}$ in Table 1.

(Internal Transmittance)

Regarding the internal transmittance, the external transmittance was measured for 1 mm-thick and 10 mm-thick samples, and internal transmittances $\tau$ at a thickness of 10 mm were obtained by the formulas (a) and (b) described above. An internal transmittance $\tau_{350\text{-}400}$ for light having a wavelength of 350 to 400 nm, an internal transmittance $\tau_{300\text{-}350}$ for light having a wavelength of 300 to 350 nm, and an internal transmittance $\tau_{260\text{-}300}$ for light having a wavelength of 260 to 300 nm were obtained, and minimum values in the respective wavelength ranges are shown in Table 1.

(T-Fe$_2$O$_3$)

The total iron oxide content (T-Fe$_2$O$_3$) was measured by ICP mass spectrometry according to the following procedure. A mixed acid of hydrofluoric acid and sulfuric acid was added to a crushed glass and heated to be decomposed. After the decomposition, hydrochloric acid was added to make the amount constant, and the concentration of Fe was measured by ICP mass spectrometry. The concentration was calculated by a calibration curve prepared using a standard solution. From the measured concentration and the amount of decomposition of the glass, T-Fe$_2$O$_3$ in the glass was calculated. As the ICP mass spectrometer, Agilent 8800 manufactured by Agilent Technologies was used.

14

(Fe$^{3+}$ Intensity)

The Fe$^{3+}$ intensity was measured by electron spin resonance (ESR) according to the following procedure. 0.3 g of crushed glass was weighed, and a copper nitrate standard solution for ICP was added as an internal standard so as to add Cu$^{2+}$ by 30 µg. After drying the sample at approximately 50° C. for around 2 hours, the sample was filled in a measuring tube for ESR, to measure an electron spin resonance spectrum. The device used was an ESR spectrometer manufactured by JEOL Ltd. The ESR measurement conditions are shown in Table 2.

In the ESR measured under the conditions shown in Table 2, the Fe$^{3+}$ signal intensity and the Cu$^{2+}$ signal intensity were defined as in the following formulas, and one obtained by excluding variations in the amplifier magnification and the measured intensity during the measurement was adopted as the Fe$^{3+}$ intensity.

$$\text{Fe}^{3+}\text{ signal intensity}=(\text{maximum value of signal intensity of Fe}^{3+}\text{ peak appearing in a magnetic field around 157 mT})-(\text{minimum value of signal intensity of Fe}^{3+}\text{ peak appearing in the magnetic field around 157 mT})$$

$$\text{Cu}^{2+}\text{ signal intensity}=(\text{maximum value of signal intensity of Cu}^{2+}\text{ peak appearing in the magnetic field around 310 mT})-(\text{minimum value of signal intensity of Cu}^{2+}\text{ peak appearing in the magnetic field around 310 mT})$$

$$\text{Fe}^{3+}\text{ intensity}=(\text{Fe}^{3+}\text{ signal intensity/amplifier magnification when measuring Fe}^{3+}\text{ signal intensity})/(\text{Cu}^{2+}\text{ signal intensity/amplifier magnification when measuring Cu}^{2+}\text{ signal intensity})$$

TABLE 1

| | | Ex. 1-1 | Ex. 1-2 | Ex. 1-3 | Ex. 1-4 | Ex. 1-5 | Ex. 1-6 | Ex. 1-7 |
|---|---|---|---|---|---|---|---|---|
| Composition (Mass % [mol %]) | $SiO_2$ | 2.66 [5.83] | 2.65 [5.80] | 2.66 [5.82] | 2.66 [5.82] | 2.66 [5.83] | 5.47 [5.61] | 2.66 [5.83] |
| | $B_2O_3$ | 35.27 [66.59] | 35.1 [66.30] | 35.26 [66.58] | 35.26 [66.57] | 35.27 [66.59] | 83.06 [73.44] | 35.27 [66.59] |
| | $La_2O_3$ | 47.81 [19.29] | 47.58 [19.21] | 47.80 [19.28] | 47.79 [19.82] | 47.81 [19.29] | — | 47.81 [19.29] |
| | $Y_2O_3$ | 14.25 [8.29] | 14.18 [8.26] | 14.25 [8.29] | 14.24 [8.29] | 14.25 [8.29] | — | 14.25 [8.29] |
| | $Li_2O$ | — | — | — | — | — | 6.54 [13.47] | — |
| | MgO | — | — | — | — | — | 4.9 [7.48] | — |
| | $SnO_2$ | — | 0.5 [0.43] | 0.03 [0.03] | — | — | 0.03 [0.01] | — |
| | SnO | — | — | — | 0.04 [0.04] | — | — | — |
| | Total | 100 [100] | 100 [100] | 100 [100] | 100 [100] | 100 [100] | 100 [100] | 100 [100] |
| | Solubility condition | Air | Air | $N_2$ atmosphere | $N_2$ atmosphere | $N_2$ atmosphere Carbon added by 0.4 mass % | $N_2$ atmosphere | Air |
| Characteristics | Minimum internal transmittance with thickness of 10 mm (%) $\tau_{350-400}$ | 94 | 96 | 97 | 98 | 96 | 95 | 86 |
| | $\tau_{300-350}$ | 81 | 85 | 90 | 91 | 90 | 85 | 46 |
| | $\tau_{260-300}$ | 53 | 58 | 72 | 72 | 74 | 75 | 19 |
| | Degree of pigmentation (nm) $\lambda_{70}$ | 303 | 290 | 275 | 273 | 278 | 249 | 344 |
| | $\lambda_5$ | 233 | 227 | 215 | 211 | 211 | <210 | 243 |
| | External transmittance $T_{260}$ (%) | 77.5 | 77.7 | 82.5 | 81.4 | 82.0 | 87.5 | 71.4 |
| | Refractive index $n_d$ | 1.74 | 1.74 | 1.74 | 1.74 | 1.74 | 1.53 | 1.74 |
| | T-$Fe_2O_3$ (mass ppm) | 0.84 | 0.78 | 0.81 | 0.88 | 0.71 | 0.80 | 1.87 |
| | $Fe^{3+}$ intensity | 0.0112 | 0.0090 | 0.0059 | 0.0028 | 0.0055 | 0.0055 | 0.0329 |

TABLE 2

|  | Fe | Cu |  |
|---|---|---|---|
| Freq | 9.436 | 9.436 | GHz |
| Power | 4 | 4 | mW |
| C.Field | 330 | 330 | mT |
| SwWid(±) | 250 | 250 | mT |
| SwTime | 2 | 2 | min |
| ModWid | 0.63 | 0.63 | mT |
| Amp | 500 | 20 |  |
| TimeC | 0.1 | 0.1 | sec |

As shown in Table 1, it can be seen from Example 1-1 that the light transmittance in the UV region can be improved by lowering the iron content. Also, from Examples 1-2 to 1-6, it was understood that when manufacturing a glass, by adding a reducing agent, and/or by setting the atmosphere during melting to be a non-oxidizing atmosphere, the valence of the iron component contained by a tiny amount could be controlled, and further, the light transmittance in the UV region could be improved. Also, although high-refractive-index glass generally has low UV transmittance, as shown with Examples 1-1 to 1-5, glass exhibiting high UV transmittance even having a high refractive index of 1.7 or higher could be realized. On the other hand, as shown with Example 1-7, in the case of not lowering the iron content and not controlling the valence of the iron component in the glass, it can be seen the transmittance is noticeably lowered. Especially, it can be seen that as the wavelength becomes shorter, the transmittance decreases more strikingly, and it is not possible to obtain a glass with a high UV light transmittance.

Example 2-1

Glass cullets having a composition of $SiO_2$ by 2.66 mol %, $B_2O_3$ by 35.27 mol %, $La_2O_3$ by 47.81 mol %, and $Y_2O_3$ by 14.25 mol % were placed in a platinum crucible, heated and melted in the air at 1300° C. for 3 hours.

The molten glass was poured into a preheated mold to be cooled and formed to be a plate, held at a temperature near the glass transition temperature for 4 hours, and then, gradually cooled down to room temperature at a cooling rate of −60° C./h, and a glass was obtained. At this time, the glass cullets were prepared to have the added amount of $SnO_2$ between 0 and 0.5 mass %, and for the obtained glass, a relationship between the added amount of $SnO_2$ and the external transmittance of the glass at 10-mm thickness at a wavelength of 270 nm was examined; the obtained graph is shown in FIG. 1.

Example 2-2

Glass cullets having a composition of $SiO_2$ by 2.66 mol %, $B_2O_3$ by 35.27 mol %, $La_2O_3$ by 47.81 mol %, and $Y_2O_3$ by 14.25 mol % were placed in a platinum crucible, and heated and melted in a melting furnace filled with nitrogen gas at 1300° C. for 3 hours.

The molten glass was poured into a preheated mold to be cooled and formed to be a plate, held at a temperature near the glass transition temperature for 4 hours, and then, gradually cooled down to room temperature at a cooling rate of −60° C./h, and a glass was obtained. At this time, the glass cullets were prepared to have the added amount of $SnO_2$ between 0 and 0.4 mass %, and for the obtained glass, a relationship between the added amount of $SnO_2$ and the external transmittance of the glass at 10-mm thickness at a wavelength of 270 nm was examined; the obtained graph is shown in FIG. 2.

(External Transmittance)

The external transmittance was measured for a sample having a thickness of 10 mm and polished on both sides, by using a spectrophotometer (manufactured by Hitachi High-Technologies Corporation, model: U-4100). In the measurement, the external transmittance was obtained with respect to light having a wavelength of 270 nm, and plotted results are shown in FIGS. 1 and 2.

Figure 2:
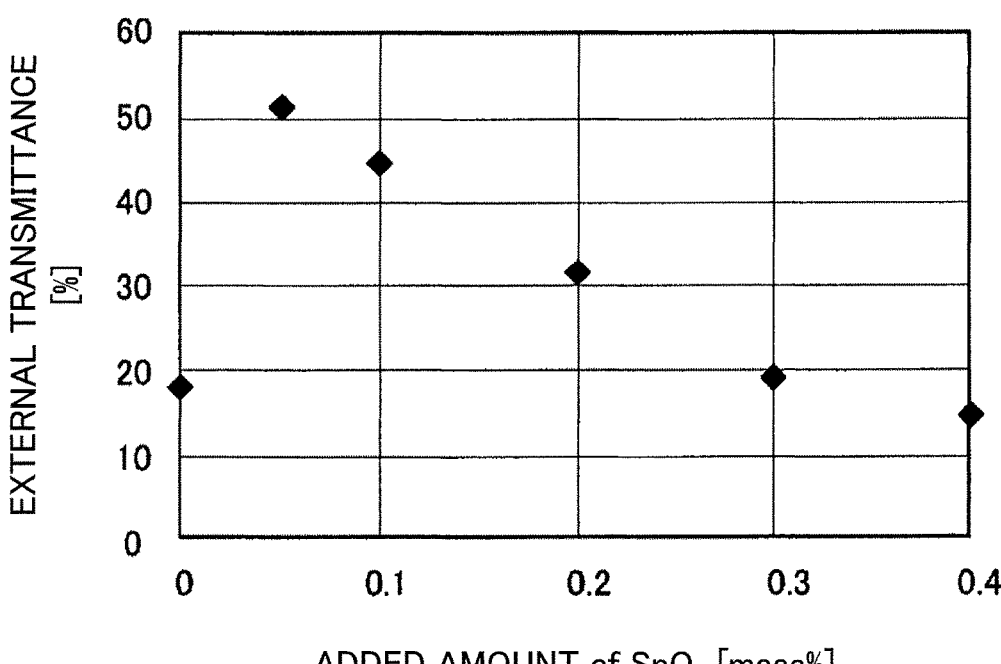
FIG. 2 is a graph illustrating a relationship between the added amount of $SnO_2$ and the external transmittance in Example 2-2.

As illustrated in FIGS. 1 and 2, in Examples 2-1 and 2-2, it can be understood that the transmittance in the UV region is significantly changed depending on the melting atmosphere of the glass and the added amount of the reducing agent. According to FIG. 1, in the melting in the air atmosphere, the addition of a reducing agent is useful, and the transmittance improves as the added amount increases, but tends to saturate when the added amount of $SnO_2$ exceeds around 0.35 mass %. Also, according to FIG. 2, in the melting in a non-oxidizing atmosphere, the transmittance is greatly improved by adding a tiny amount of $SnO_2$, but once exceeding the optimal amount of $SnO_2$ that improves the transmittance most, the transmittance decreases as the added amount of $SnO_2$ increases. In Examples 2-1 and 2-2, although $SnO_2$ was added, similar results are obtained when SnO or a mixture of SnO and $SnO_2$ are added.

In other words, the melting atmosphere and the added amount of the reducing agent have suitable conditions, respectively, and particularly in the non-oxidizing atmosphere, it can be seen that it is favorable to add a tiny amount of a reducing agent. Also, it can be seen that even in the oxidizing atmosphere, the transmittance in the UV region can be greatly improved by adding the reducing agent up to an appropriate amount.

As above, it was found that each of UV-transmitting glasses of the present examples has a good UV transmittance, and the method of manufacturing a UV-transmitting glass of each of the present examples can stably manufacture such a UV-transmitting glass.

The present disclosure has been described in detail with reference to specific embodiments, and it is apparent to those skilled in the art that various changes and modifications can be made without departing from the spirit and scope of the present inventive concept.

The invention claimed is:

1. A method of manufacturing a UV-transmitting glass, the method comprising:

melting glass raw materials or glass cullets; and cooling a glass melt to be solidified, wherein during the melting, a melting atmosphere is a non-oxidizing atmosphere, and a reducing agent is contained in the glass raw materials or the glass cullets, wherein the reducing agent is a tin oxide containing at least one species selected from among $SnO_2$ and SnO, and the reducing agent is contained in the UV-transmitting glass by an amount of greater than 0 mass % and less than or equal to 0.3 mass %, wherein the UV-transmitting glass has an internal transmittance $\tau_{300-350}$(%) with respect to light having a wavelength between 300 nm and 350 nm through a 10 mm-thick glass that satisfies formula (2):

$$\tau_{300-350} \geq 86\% \qquad (2)$$

wherein the UV-transmitting glass comprises, in terms of mol % on an oxide basis:

10-80% of $B_2O_3$;

0-25% of $SiO_2$; and 2-22% of $La_2O_3$; and 5-15% of $Y_2O_3$, and the UV-transmitting glass has an internal transmittance $\tau_{260\text{-}300}$(%) with respect to light having a wavelength between 260 nm and 300 nm through a 10 mm-thick glass that satisfies formula (3):

$$\tau_{260\text{-}300} \geq 65\% \qquad (3).$$

2. The method of manufacturing the UV-transmitting glass as claimed in claim 1, wherein the UV-transmitting glass has an $Fe^{3+}$ intensity of less than or equal to 0.0059 as measured by electron spin resonance (ESR).

3. The method of manufacturing the UV-transmitting glass as claimed in claim 1, wherein the UV-transmitting glass has an iron oxide content $T\text{-}Fe_2O_3$ in the glass, as converted into $Fe_2O_3$, being less than or equal to 1.5 mass ppm.

4. The method of manufacturing the UV-transmitting glass as claimed in claim 1, wherein a refractive index of the UV-transmitting glass is greater than or equal to 1.7.

5. The method of manufacturing the UV-transmitting glass as claimed in claim 1, wherein the UV-transmitting glass has a content of $Bi_2O_3$, $TiO_2$, $WO_3$, and $Gd_2O_3$ each being less than or equal to 3 mol %, in terms of mol % on an oxide basis.

6. The method of manufacturing the UV-transmitting glass as claimed in claim 5, wherein the UV-transmitting glass has a content of $Nb_2O_5$ being less than or equal to 3 mol %, in terms of mol % on an oxide basis.

7. The method of manufacturing the UV-transmitting glass as claimed in claim 5, wherein the UV-transmitting glass has a content of $Ta_2O_5$ being less than or equal to 3 mol %, in terms of mol % on an oxide basis.

8. The method of manufacturing the UV-transmitting glass as claimed in claim 1, wherein the reducing agent is a tin oxide containing at least one species selected from among $SnO_2$ and $SnO$, and the reducing agent is contained in the UV-transmitting glass by an amount of greater than 0 mass % and less than or equal to 0.2 mass %.

9. The method of manufacturing the UV-transmitting glass according to claim 1, wherein the UV-transmitting glass comprises, in terms of mol % on an oxide basis, 8-15% of $Y_2O_3$.

* * * * *